United States Patent
Suzuki

(10) Patent No.: US 6,983,107 B2
(45) Date of Patent: Jan. 3, 2006

(54) OPTICAL DEVICE HAVING IMAGE BLUR PREVENTION FUNCTION

(75) Inventor: Ryoichi Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/819,875

(22) Filed: Apr. 7, 2004

(65) Prior Publication Data

US 2004/0202459 A1  Oct. 14, 2004

(30) Foreign Application Priority Data

Apr. 8, 2003 (JP) .............................. 2003-103997

(51) Int. Cl.
*G03B 5/00* (2006.01)
(52) U.S. Cl. ...................................................... 396/55
(58) Field of Classification Search ............ 395/52–55; 348/208.99, 208.1–208.11; 396/52–55
See application file for complete search history.

(56) References Cited

U.S. PATENT DOCUMENTS 5,155,520 A * 10/1992 Nagasaki et al. ............. 396/53
6,009,278 A * 12/1999 Okano et al. ................. 396/55

FOREIGN PATENT DOCUMENTS

JP  6-250272 A  9/1994

* cited by examiner

*Primary Examiner*—W. B. Perkey
(74) *Attorney, Agent, or Firm*—Morgan & Finnegan, LLP

(57) ABSTRACT

The present invention provides a camera system with an image blur prevention function, including: an interchangeable lens, a camera main body to which the interchangeable lens is detachably attached, a first switch which is disposed in the interchangeable lens and indicates execution of the image blur prevention function, a second switch which is disposed in the camera main body and indicates the execution of the image blur prevention function, and a controller which controls an on/off operation of the image blur prevention function of the camera system in accordance with at least one state of the first switch and the second switch.

1 Claim, 6 Drawing Sheets

OPTICAL DEVICE HAVING IMAGE BLUR PREVENTION FUNCTION

BACKGROUND OF THE INVENTION

1. Field of the Invention

The present invention relates to an optical device such as a camera system having an image blur prevention function, the camera system including an interchangeable lens and a camera main body that is equipped with the interchangeable lens.

2. Related Background Art

Up to now, some optical devices, such as a camera system that is structured by an interchangeable lens and a single-lens reflex camera that is equipped with the interchangeable lens in use, have an image blur prevention function that prevents a hand vibration at the time of photographing.

In each of the above-mentioned optical devices, both of an image blur detection means and an image blur correction optical system are disposed within the interchangeable lens so as to control the start and completion of the image blur correcting operation through the operation of an operation unit at a camera side.

A gyro sensor is generally employed as a vibration detection means which is disposed within the interchangeable lens. At least two gyro sensors are required for detection in a pitch direction and a yaw direction, and the gyro sensors remain expensive from the structural viewpoint. In the camera system such as the single-lens reflex camera, it is desirable that the costs of the interchangeable lenses be reduced by installing high-cost elements such as the above-mentioned sensors at the camera main body side.

The reason is that since several interchangeable lenses are prepared and interchanged in use, the reduction in the costs of the interchangeable lenses is greatly advantageous in the cost reduction as a total system.

From this viewpoint, Japanese Patent Application Laid-Open No. H06-250272 and so on have proposed an image blur prevention single-lens reflex camera system having a vibration detection means within the camera main body and an image blur correction optical system within the interchangeable lens.

It is possible that the camera-main body having the vibration detection means be equipped with a conventional interchangeable lens having a vibration prevention function with both of the above-mentioned vibration detection means and an image blur correction means (hereinafter referred to as "image stabilizer (IS) interchangeable lens").

Also, since the IS interchangeable lens is designed under the assumption that the conventional camera main body that is not associated with the image blur prevention function at all (the camera main body having no vibration detection sensor) is installed as the camera main body with the IS interchangeable lens, an on/off changeover switch for the image blur prevention function is located at the IS interchangeable lens side.

Therefore, when the above-mentioned conventional IS interchangeable lens is installed in the camera main body having the image blur detection means within the camera main body, the on/off changeover switch for the image blur prevention function is located at both of the camera main body and the IS interchangeable lens.

It should be noted that the camera system disclosed in the above-mentioned Japanese Patent Application Laid-Open No. H06-250272 is not proposed taking into consideration control under the condition where the on/off changeover switch for the image blur prevention function is disposed at both of the camera main body and the IS interchangeable lens.

SUMMARY OF THE INVENTION

The present invention has been made in view of the above-mentioned circumstances, and therefore an object of the present invention is to provide an optical device that is capable of realizing an excellent operability such as a camera system which is structured to provide a switch for executing an image blur prevention function at each of an interchangeable lens and a camera main body.

To achieve the above object, according to the present invention, there is provided a camera system with an image blur prevention function, including:
an interchangeable lens;
a camera main body to which the interchangeable lens is detachably attached;
a first switch which is disposed in the interchangeable lens and switchable between an on state and an off state;
a second switch which is disposed in the camera main body and switchable between an on state and an off state; and
a controller that controls an on/off operation of the image blur prevention function of the camera system in accordance with states of the first and second switches.

Furthermore, according to the present invention, there is provided a camera system with an image blur prevention function, including:
an interchangeable lens;
a camera main body to which the interchangeable lens is detachably attached;
a first vibration detector disposed in the interchangeable lens;
a first switch disposed in the interchangeable lens;
a second vibration detector disposed in the camera main body;
a second switch disposed in the camera main body; and
a controller which can execute the image blur prevention function in a state where the first switch and the second switch turn on.

Furthermore, according to the present invention, there is provided a camera system with an image blur prevention function, including:
an interchangeable lens;
a camera main body to which the interchangeable lens is detachably attached;
a first vibration detector disposed in the interchangeable lens;
a first switch disposed in the interchangeable lens;
a second vibration detector disposed in the camera main body;
a second switch disposed in the camera main body;
a release switch disposed in the camera main body; and
a controller which can execute the image blur prevention function in a state where the release switch turns on, and the first switch and the second switch turn on.

Furthermore, according to the present invention, there is provided a camera system with an image blur prevention function, including:
an interchangeable lens;
a camera main body to which the interchangeable lens is detachably attached;
a first switch which is disposed in the interchangeable lens and indicates execution of an image blur prevention function of the interchangeable lens;

a second switch which is disposed in the camera main body and indicates the execution of an image blur prevention function of the camera main body; and a controller which controls an on/off operation of the image blur prevention functions of the camera system in accordance with at least one state of the first switch and the second switch.

Furthermore, according to the present invention, there is provided a camera system with an image blur prevention function, including:

an interchangeable lens;

a camera main body to which the interchangeable lens is detachably attached;

a first switch which is disposed in the interchangeable lens and indicates execution of an image blur prevention function of the interchangeable lens; and a second switch which is disposed in the camera main body and indicates the execution of an image blur prevention function of the camera main body.

The features of the optical device in accordance with the present invention will become more apparent from the following description of the specific embodiments with reference to the accompanying drawings.

DESCRIPTION OF THE PREFERRED EMBODIMENTS

Now, a description will be given in more detail of preferred embodiments of the present invention with reference to the accompanying drawings.

(First Embodiment)

Figure 1:
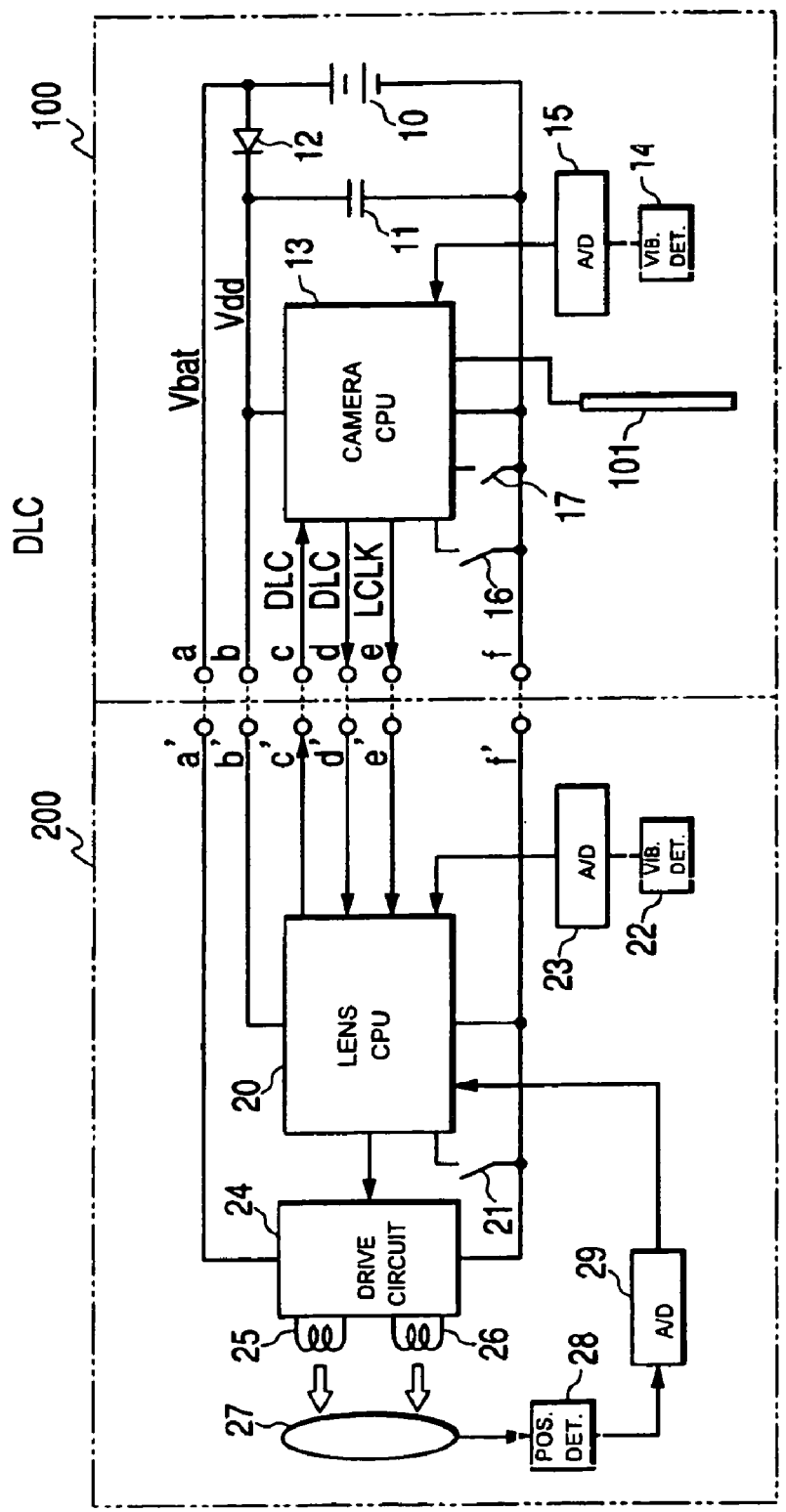
FIG. 1 is a block diagram showing a first embodiment of the present invention.

FIG. 1 is a block diagram for explaining an interchangeable lens and a camera main body in accordance with an embodiment of the present invention, in which reference numeral 200 denotes an interchangeable lens and reference numeral 100 denotes a camera main body.

Referring to FIG. 1, reference numeral 10 denotes a power battery which is accommodated within the camera main body, reference numeral 11 denotes a capacitor for smoothing a power, and reference numeral 12 denotes a diode for current reverse flow prevention. Reference numeral 13 denotes a camera CPU which is located within the camera main body, and reference numeral 14 denotes a vibration detector such as a gyro sensor. Reference numeral 15 denotes an A/D converter that subjects a detection output of the vibration detector 14 to A/D conversion and an A/D conversion value is input to a parallel input port of the camera CPU 13. Reference numeral 16 denotes an on/off changeover switch for the image blur prevention function, which is connected to an input port of the camera CPU 13. Reference numeral 17 denotes an SW1 switch that turns on with a first stroke of a release button of the camera, and its output is connected to an input port of the camera CPU 13. Reference numeral 101 denotes a film surface or an image pickup surface of an image pickup element such as a CCD or a CMOS.

Reference symbols a to f denote mount terminals disposed on the camera main body 100. The terminal a is connected to a plus terminal (Vbat) of the power battery 10, and the terminal b is connected to a power supply Vdd of the camera CPU 13. The terminal c is a mount terminal that receives data DLC for the camera CPU 13 from the lens CPU (described later), and is connected to an input terminal of the camera CPU 13. The terminal d is a mount terminal that transmits data DCL for the lens CPU from the camera CPU 13 and is connected to an output port of the camera CPU 13. The terminal e is a mount terminal that transmits a transfer clock LCLK to be transmitted to the lens CPU from the camera CPU 13, which is connected to a clock output terminal of the camera CPU 13.

Reference numeral 20 denotes a lens CPU installed within the interchangeable lens 200, and reference numeral 22 denotes a vibration detector such as a gyro sensor. Reference numeral 23 denotes an A/D converter that subjects a detection output of the vibration detector 22 to A/D conversion, and an A/D conversion value from the A/D converter is input to a parallel input port of the lens CPU 20.

Reference numeral 21 denotes an on/off changeover switch for the image blur prevention function, which is disposed on a main body of the interchangeable lens 200 so as to be operational by a user. The switch 21 is connected to an input port of the lens CPU 20. Reference numeral 24 denotes a drive circuit for the correction optical system, and reference numerals 25 and 26 denote driving coils in yaw and pitch directions of the correction optical system, respectively. Reference numeral 27 denotes a correction optical system within the interchangeable lens. The interchangeable lens 200 has an image taking optical system (omitted from the figures) including the correction optical system 27, and an image from the image taking optical system is formed on the image pickup surface of the camera main body 100.

Reference symbols a' to f' denote mount terminals provided on the interchangeable lens 100, and when the interchangeable lens 100 is attached onto the camera main body 200, the mount terminals a' to f' at the interchangeable lens side are connected to the mount terminals a to f at the camera side.

The mount terminal a' is connected to a power terminal of the drive circuit 24 for the correction optical system. The mount terminal b' is connected to a power terminal of the lens CPU 20. The mount terminal c' is a transmit terminal of the data DLC that is transmitted to the camera CPU 13 from the lens CPU 20, and the mount terminal c' is connected to an output port of the lens CPU 20. The mount terminal d' is a receive terminal of the data DCL that is transmitted to the lens CPU 20 from the camera CPU 13, and the mount terminal d' is connected to an input port of the lens CPU 20. The mount terminal e' is a receive terminal of a clock signal LCKL which is transmitted to the lens CPU 20 from the camera CPU 13, and the mount terminal e' is connected to a clock input terminal of the lens CPU 20.

The drive circuit 24 for the correction optical system is controlled by the lens CPU 20 and controls the energization direction and PWM amount of an energization current in each of the driving coils 25 and 26 for the yaw direction and the pitch direction in accordance with the driving direction and the driving amount in the yaw direction and the pitch direction of the correction optical system which are calculated by the lens CPU 20.

Reference numeral 28 denotes a position detector for the correction optical system 27 in the pitch and yaw directions, the position detector being structured by, for example, the combination of a hole element or an IRED with a PSD. Reference numeral 29 denotes an A/D converter that subjects the detection output of the position detector 28 to A/D conversion, and an output from the A/D converter 29 is input to a parallel input port of the lens CPU 20.

The lens CPU 20 compares a position signal of the correction optical system which is input from the A/D converter 29 with a calculated value of the driving amount of the above correction optical system 27 which is to be corrected and driven, controls the drive circuit 24 on the basis of the PWM value that corresponds to a difference between the position signal and the calculated value, and drives the respective driving coils 25 and 26 for the pitch direction and the yaw direction by means of the drive circuit 24 so as to drive the correction optical system 27 to a given position, thereby conducting the vibration prevention operation.

Figure 2:
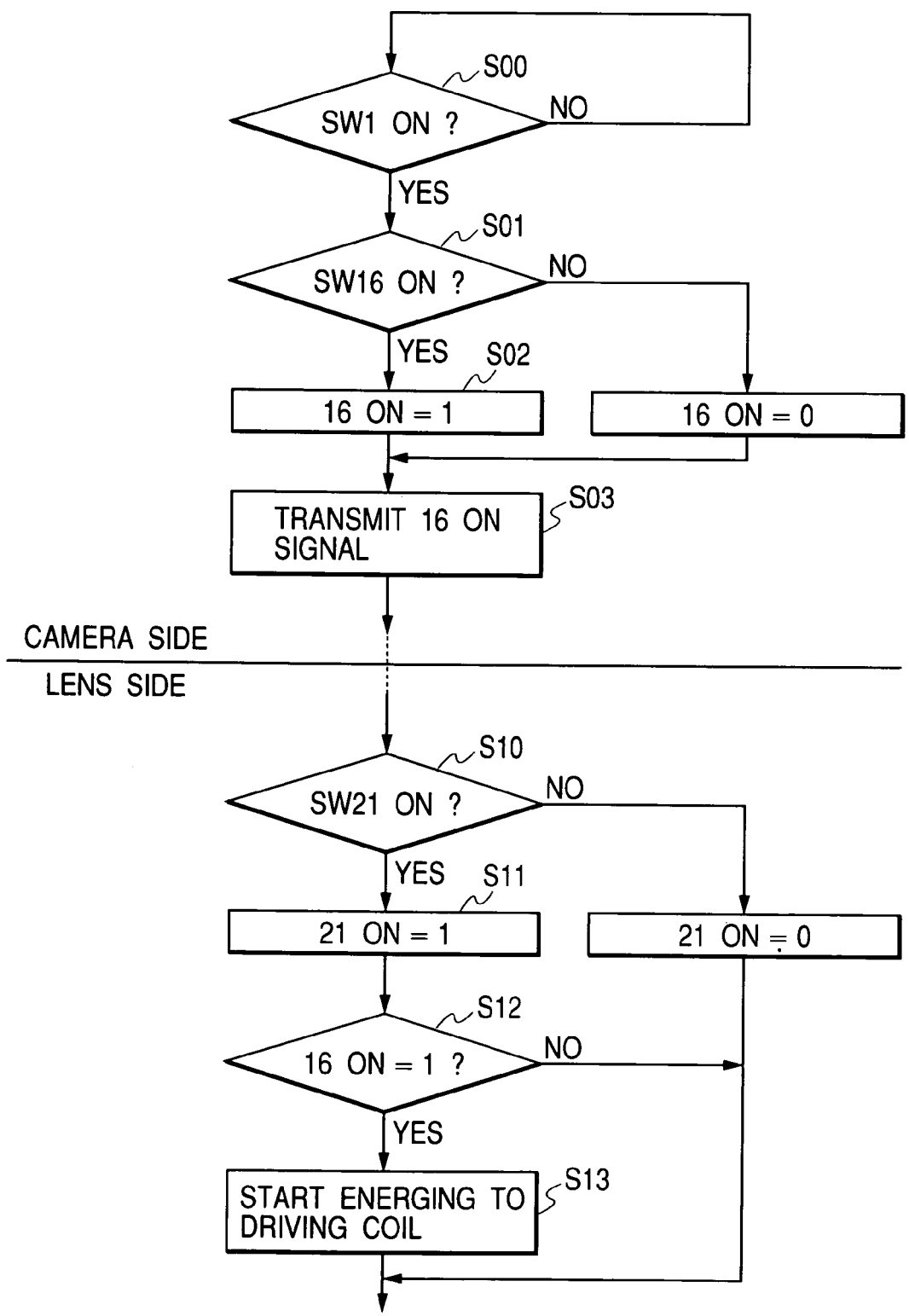
FIG. 2 is a flowchart showing the first embodiment of the present invention.

The operation of a first example of the embodiment structured as described above will be described with reference to a flowchart of FIG. 2.

The Operation of the First Example

<The Operation of Camera CPU 13>

(Steps S00 and S01)

It is confirmed whether the SW1 switch 17 is turned on by depressing the first stroke of the release button of the camera main body 100 in a state where the interchangeable lens 200 is attached onto the camera main body 100, or not (Step S00). Upon detection of an on-state of the SW1 switch 17, the camera CPU 13 detects whether the on/off changeover switch 16 for the image blur prevention function at the camera main body side is on or off (Step S01).

(Step S02)

In Step S01, when the switch 16 is on, the camera CPU 13 sets a 16ON signal within its RAM to "1" whereas when the switch 16 is off, the camera CPU 13 sets the 16ON signal to "0".

(Step S03)

Then, the camera CPU 13 transfers the 16ON signal to the lens CPU 20 from the camera CPU 13 through a DCL line. The 16ON signal is held within the RAM of the lens CPU 20.

<The Operation of Lens CPU 20>

(Steps S10 and S11)

The lens CPU 20 detects the on/off state of the on/off changeover switch 21 for the image blur prevention function at the interchangeable lens side (Step S10). When the switch 21 is on, the lens CPU 20 sets a 21ON signal within its RAM to "1" whereas the switch 21 is off, the lens CPU 20 sets the 21ON signal to "0" (Step S11).

(Steps S12 and S13)

Then, the lens CPU 20 judges whether the 16ON signal is set to "1", or not (Step S12), and if the 16ON signal is set to "1" in Step S02, control is shifted to Step S13, thereby starting the energization control operation of the driving coils 25 and 26 in the correction optical system.

In the case where the 16ON signal is set to "0" in Step S02, and in the case where the 21ON signal is set to "0" in Step S11, Step S13 is passed on, so that the image blur prevention function is not executed.

Upon starting the operation of the image blur prevention function, the camera CPU 13 subjects conversion data, which has been obtained by processing an output voltage (corresponding to an angular velocity signal) of the gyro sensor 14 through the A/D converter 15, to digital filter processing and integration processing, to thereby produce a digital signal corresponding to an angular displacement signal. The digital signal is transferred to the lens CPU 20 from the camera CPU 13 through the communication line DCL at a sampling rate of, for example, about 1 KHZ.

The lens CPU 20 calculates the digital signal that has been transferred from the camera CPU 13 and vibration absorption sensitivity data stored in its ROM to obtain the driving amount of the correction optical system 27 which is to be corrected and driven.

The positions of the correction optical system in the pitch and yaw directions are detected by the position detector 28, a detection output from the position detector 28 is converted into a digital signal through the A/D converter 29, and then input to the parallel input port of the lens CPU 20.

The lens CPU 20 compares a position signal of the correction optical system which is input from the A/D converter 29 with a calculated value of the driving amount of the correction optical system 27 which is to be corrected and driven, and controls the drive circuit 24 on the basis of a PWM value that corresponds to a difference between the position signal and the calculated value. The driving coils 25 and 26 in the pitch direction and the yaw direction are driven by the drive circuit 24, respectively, to drive the correction optical system to a given position, thus conducting the vibration prevention operation.

In the above-mentioned embodiment, although the image blur prevention operation is conducted by using the output of the gyro sensor 14 within the camera main body 100, it is possible to conduct the image blur prevention operation by using the output of the gyro sensor 22 at the interchangeable lens 200 side. In the case of using the gyro sensor 22 at the interchangeable lens 200 side, it is possible that a power supply to the gyro sensor 14 at the camera main body 100 side stop in order to save a power in the camera system.

Figure 3:
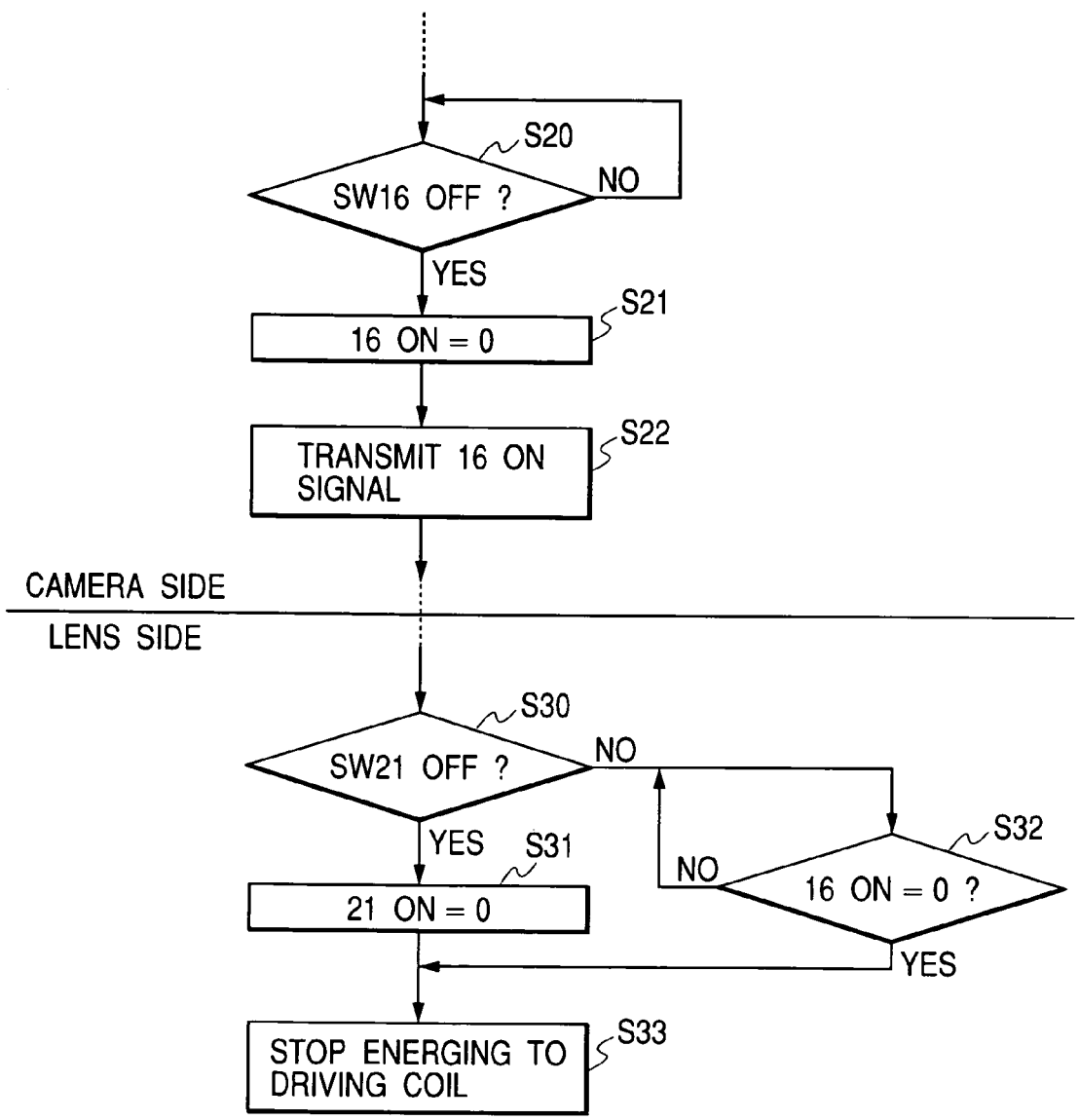
FIG. 3 is a flowchart showing the first embodiment of the present invention.

Now, a description will be given of the operation when the on/off changeover switch for the image blur prevention function at the camera main body side or the interchangeable lens side turns off after the driving coil starts to be energized with reference to a flowchart of FIG. 3.

<The Operation of Camera CPU 13>

(Step S20)

The camera CPU 13 detects whether the changeover switch 16 at the camera main body side turns off, or not.

(Step S21)

In Step S20, in the case where the changeover switch 16 is off, the camera CPU 13 sets the 16ON signal within its RAM to "0".

(Step S22)

In this situation, the camera CPU 13 transfers the 16ON signal to the lens CPU 20 through the communication line DCL, and the lens CPU 20 stores the signal in its RAM.

<The Operation of Lens CPU 20>

(Step S30)

The lens CPU 20 detects whether the on/off changeover switch 21 for the image blur prevention function at the interchangeable lens side turns off, or not.

(Steps S31 and S32)

In Step S30, if the changeover switch 21 is off, the lens CPU 20 sets the 21ON signal within its RAM to "0" (Step S31). Also, in Step S30, if the changeover switch 21 is not off, the lens CPU 20 judges whether the 16ON signal within its RAM is set to "0", or not (Step S32).

(Step S33)

In the case where the 21ON signal is set to "0" in Step S31, and in the case where the 16ON signal is judged to be "0" in Step S32, control is shifted to Step S33, to thereby stop the energization of the driving coils 25 and 26 in the pitch direction and the yaw direction, respectively. This makes the execution per se of the image blur prevention function stop.

As described above, according to this embodiment, the image blur prevention function is executed only when both of the on/off changeover switches for the image blur prevention function at the camera side and the interchangeable lens side turn on.

Also, when any one of the on/off changeover switches for the image blur prevention function at the camera main body side and the interchangeable lens side turns off, the image blur prevention function stops being executed, so that it is possible to provide the operationality with no uncomfortable feeling for a user.

In the above-mentioned embodiment, the lens CPU side finally judges that both of the changeover switches for the image blur prevention function at the camera main body and the interchangeable lens turn on. However, the present invention is not limited to this embodiment. For example, it is possible that the on/off signal of the changeover switch at the interchangeable lens side is transferred to the camera main body side so that the judgment is made by the camera CPU.

Also, instead of the above-mentioned software processing using the CPU, the above control may be executed by a hardware circuit.

In the description of the above-mentioned embodiment (the operation of the first example), in the case where both of the switches 16 and 21 at the lens side and the camera side turn on, the image blur correction function is executed, and when any one of those switches 16 and 21 turns off, the image blur correction function stops. Alternatively, the present invention can be so designed as to conduct the following operation. Hereinafter, another operation will be described.

(Second Embodiment)

Figure 4:
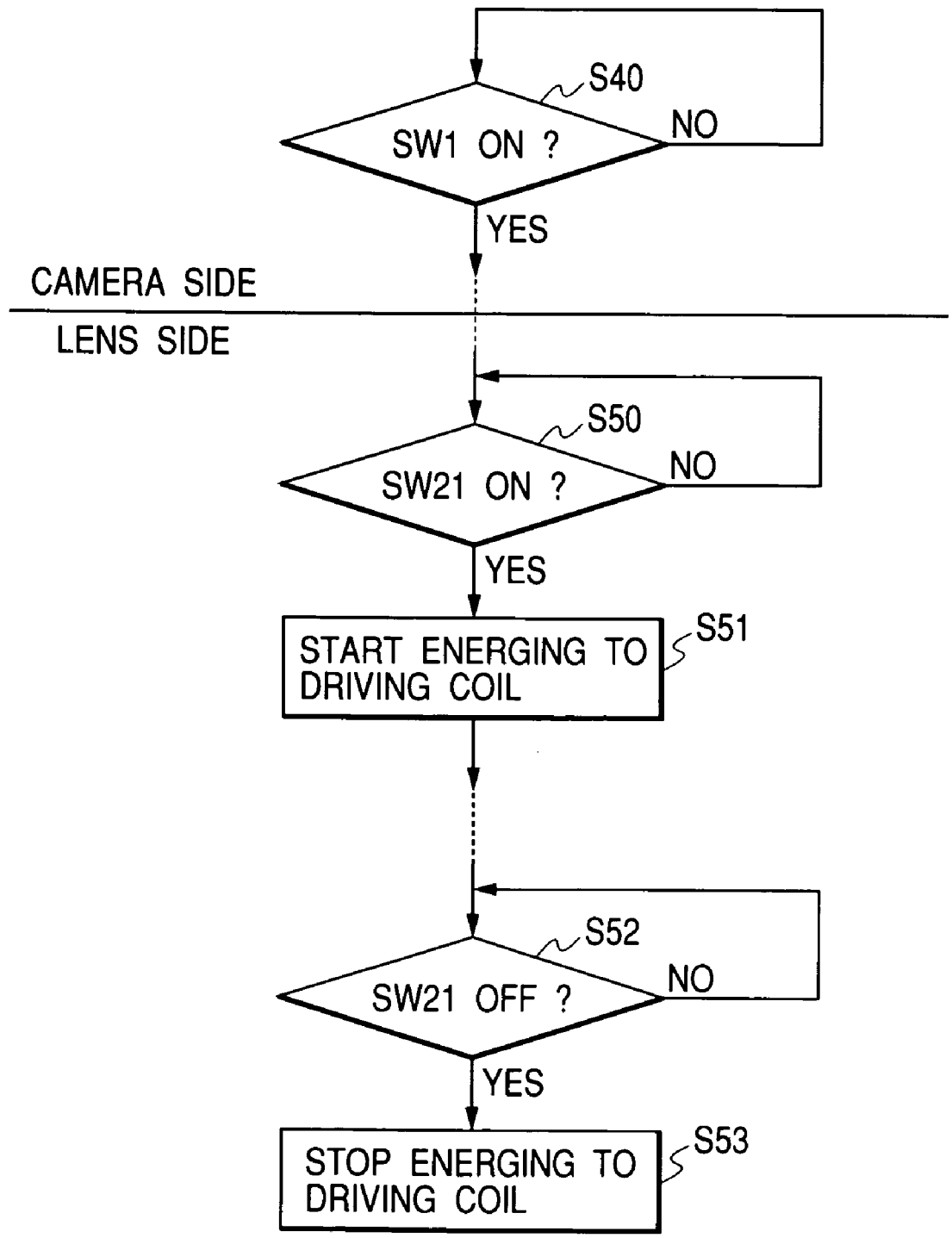
FIG. 4 is a flowchart showing a second embodiment of the present invention.

Now, a description will be given of a second operation in accordance with another embodiment of the camera system shown in the block diagram of FIG. 1 with reference to flowcharts shown in FIG. 4 and subsequent figures.

In this embodiment, the structure of the camera system is identical with that shown in FIG. 1, and the operations of the camera CPU and the lens CPU are different from those in the first embodiment.

<The Operation of Camera CPU 13>

(Step S40)

The camera CPU 13 detects whether the SW1 switch 17 is turned on by depressing the first stroke of the release button of the camera main body 100 in a state where the interchangeable lens 200 is attached onto the camera main body 100, or not. Upon detection of an on-state of the SW1 switch 17, the camera CPU 13 transfers a command representing that the SW1 switch has turned on to the lens CPU 20 through the communication line DCL.

<The Operation of Lens CPU 20>

(Step S50)

Upon receiving the command representing that the SW1 switch has turned on, the lens CPU 20 detects a state of the on/off changeover switch 21 for the image blur prevention function at the lens side.

(Step S51)

In Step S50, when the changeover switch 21 turns on, the driving coils 25 and 26 in the pitch direction and the yaw direction start to be energized, and the image blur prevention function starts to be executed (the image blur prevention operation is conducted by using the output of the gyro sensor 22 at the interchangeable lens 200 side).

(Steps S52 and S53)

The lens CPU 20 detects the state of the on/off changeover switch 21 for the image blur prevention function, and stops the energization of the driving coils 25 and 26 in the pitch direction and the yaw direction if the on/off changeover switch 21 is off.

In the above operation, when the on/off changeover switch for the image blur prevention function at the interchangeable lens side turns on, the image blur prevention function starts to be executed, and when the changeover switch at the interchangeable lens side turns off, the image blur prevention function stops being executed.

Accordingly, in this embodiment, a user who is used to employing the camera system in which the interchangeable lens with the image blur prevention function (the interchangeable lens having the on/off changeover switch for the image blur prevention function) is attached onto the conventional camera main body (the camera main body having no on/off changeover switch for the image blur prevention function) in use, can handle the camera system of this embodiment by the same operation as the conventional operation because the image blur prevention function is executed when the on/off changeover switch for the image blur prevention function at the interchangeable lens side turns on whereas the image blur prevention function stops being executed when the on/off changeover switch for the image blur prevention function at the interchangeable lens side turns off.

Now, still another operation of the present invention will be described below.

(Third Embodiment)

Figure 5:
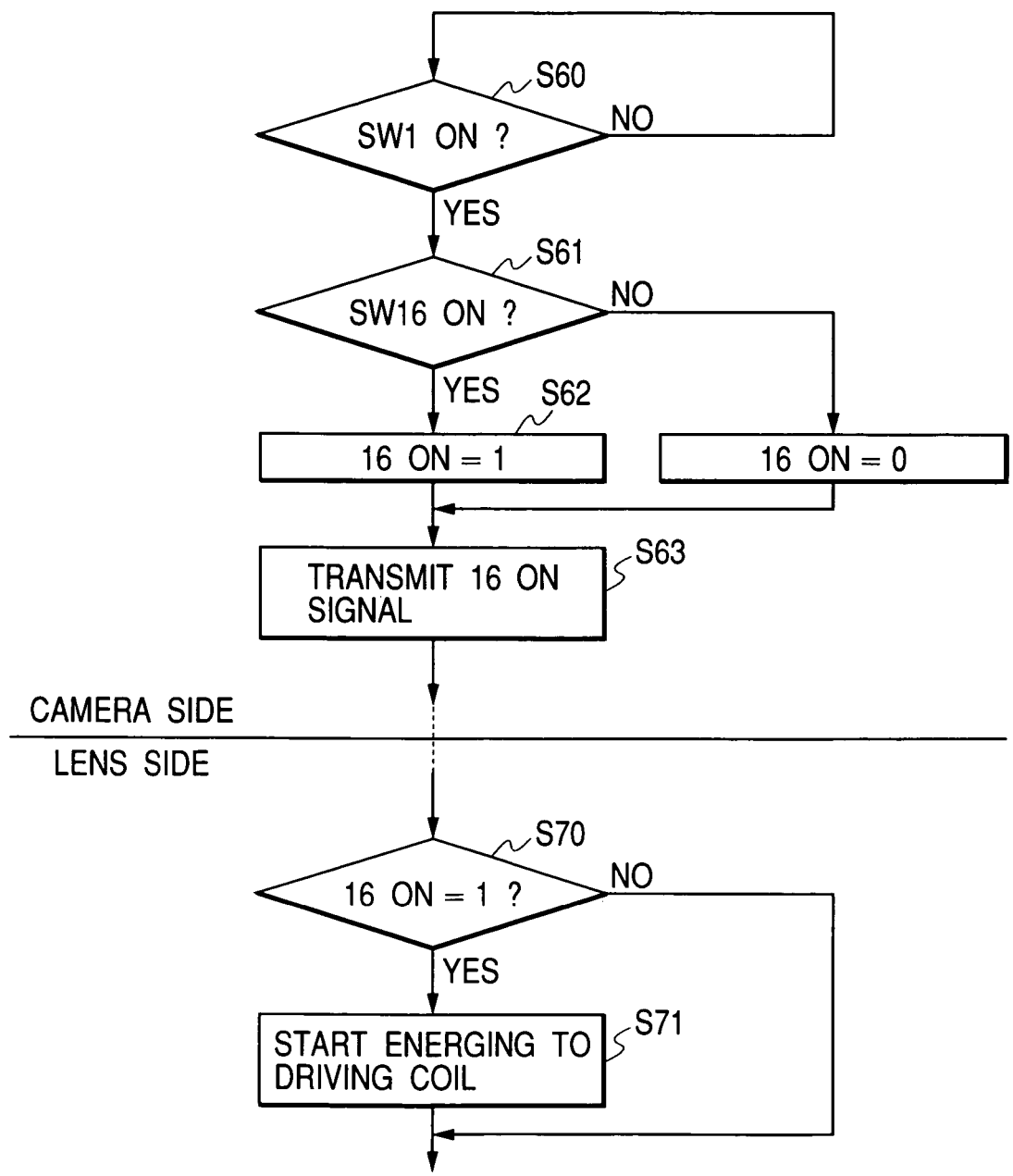
FIG. 5 is a flowchart showing a third embodiment of the present invention.

Now, a description will be given of a third operation in accordance with still another embodiment of the camera system shown in the block diagram of FIG. 1 with reference to a flowchart shown in FIG. 5. In this embodiment, the structure of the camera system is identical with that shown in FIG. 1, and the operations of the camera CPU and the lens CPU are different from those in the first embodiment.

<The Operation of Camera CPU 13>

(Step S60)

The camera CPU 13 detects whether the SW1 switch 17 turns on, or not.

(Step S61)

In Step S60, when the SW1 switch is on, the camera CPU 13 detects whether the on/off changeover switch 16 for the image blur prevention function at the camera side is in an on-state, or not.

(Step S62)

In Step S61, when the changeover switch 16 is on, the camera CPU 13 sets a 16ON signal within its RAM to "1"

whereas when the changeover switch 16 is off in Step S61, the camera CPU 13 sets the 16ON signal to "0".

(Step S63)

The camera CPU 13 transfers the 16ON signal to the lens CPU 20 through the communication line DCL.

<The Operation of Lens CPU 20>

(Step S70)

The lens CPU 20 judges the level of the transferred 16ON signal. If the 16ON signal is set to "1", control is shifted to Step S71.

(Step S71)

The lens CPU 20 starts the energization of the driving coils 25 and 26 in the pitch direction and the yaw direction, and starts the execution of the image blur correction function.

In Step S70, when the 16ON signal is set to "0", Step S71 is skipped, and hence the image blur prevention function does not start to be executed.

In the above-mentioned operation, the image blur prevention function starts to be executed if at least the on/off changeover switch for the image blur prevention function at the camera main body side turns on.

Figure 6:
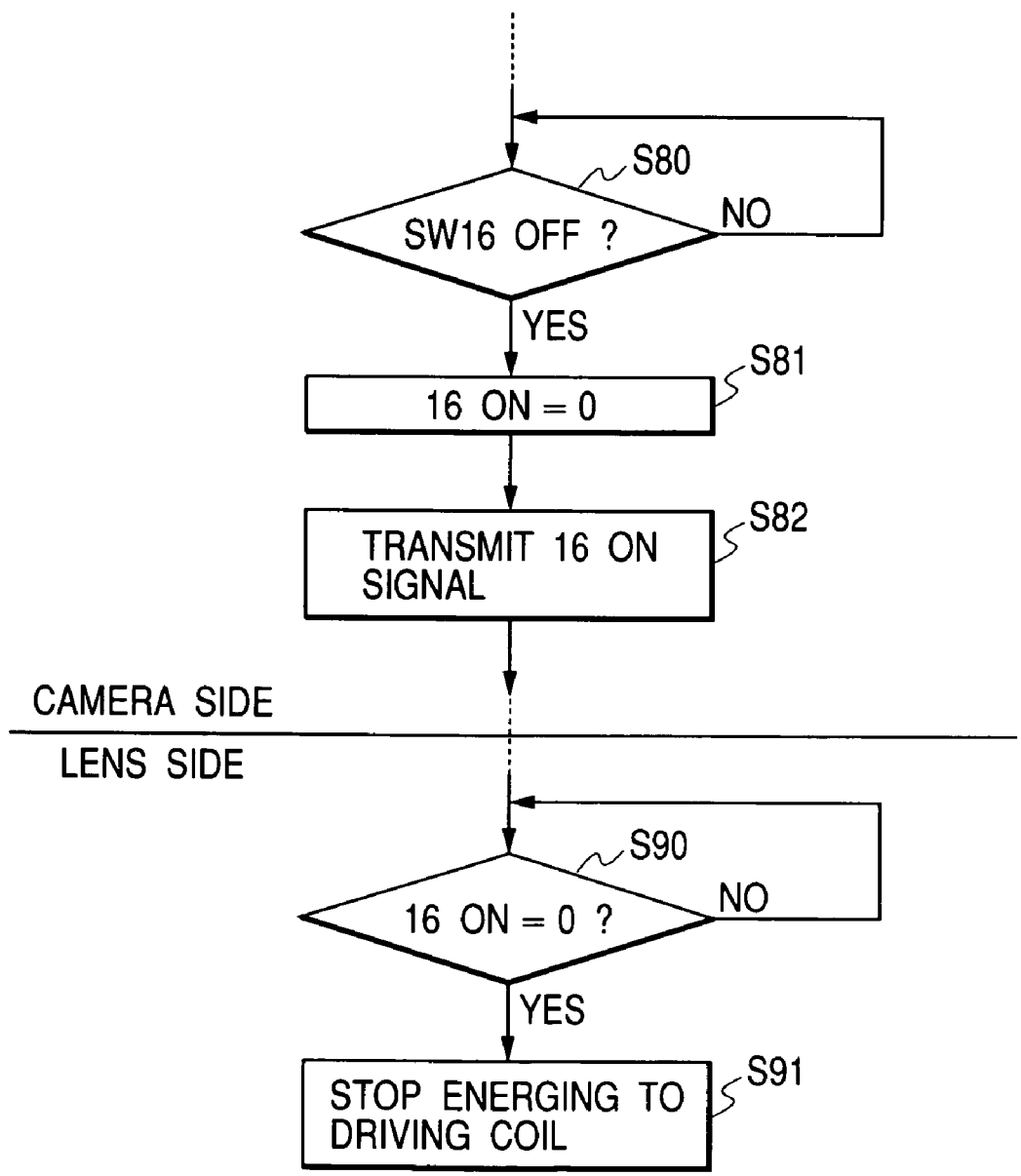
FIG. 6 is a flowchart showing the third embodiment of the present invention.

Now, a description will be given of an operation when the on/off changeover switch for the image blur prevention function turns off after the above-mentioned operation with reference to a flowchart shown in FIG. 6.

<The Operation of Camera CPU 13>

(Step S80)

The camera CPU 13 detects whether the on/off changeover switch 16 for the image blur prevention function at the camera main body side turns off, or not.

(Step S81)

In Step S80, when the switch 16 is off, the camera CPU 13 sets the 16ON signal within its RAM to (Step S82)

The camera CPU 13 transfers the 16ON signal to the lens-CPU 20. The lens CPU 20 stores the signal in its RAM.

<The Operation of Lens CPU 20>

(Step S90)

The lens CPU 20 judges the level of the 16ON signal within its RAM.

(Step S91)

In Step S90, when the 16ON signal is "0" in level, the driving coils 25 and 26 stop being energized to stop the execution of the image blur prevention function.

In the above-mentioned operation, when the on/off changeover switch for the image blur prevention function at the camera main body side turns on, the image blur prevention function starts to be executed whereas the changeover switch at the camera main body side turns off, the image blur prevention function stops being executed.

Therefore, in this embodiment, a user who is used to employing the camera system in which the interchangeable lens with the image blur prevention function (the interchangeable lens having no on/off changeover switch for the image blur prevention function) is attached onto the camera main body (the camera main body having the on/off changeover switch for the image blur prevention function) in use, can handle the camera system of this embodiment by the same operation as the conventional operation because the image blur prevention function is executed when the on/off changeover switch for the image blur prevention function at the camera main body side turns on whereas the image blur prevention function stops being executed when the on/off changeover switch for the image blur prevention function at the camera main body side turns off.

In the above-mentioned embodiment, the image blur prevention function is executed when any one of the on/off changeover switches for the image blur prevention function at the camera main body side and the interchangeable lens side turns on, so that the operation feeling of the camera system is largely improved.

Also, in the above-mentioned embodiment, the image blur prevention function stops being executed when any one of the on/off changeover switches for the image blur prevention function at the camera main body side and the interchangeable lens side turns on, so that it is possible to provide the operationality with no uncomfortable feeling for a user.

In the descriptions of the above-mentioned respective embodiments, the correction optical system is disposed in the photographic optical system of the interchangeable lens as a structure that achieves the image blur prevention function. Alternatively, the image blur prevention function may be executed at the camera main body side. For example, it is possible that the image pickup surface of the camera main body side (the film surface or the image pickup surface of the image pickup element such as a CCD or a CMOS) can be moved in accordance with the output of a sensor that detects the blur so as to conduct the image blur correction (the image blur prevention function at the camera side). In addition, in the case where the image pickup element such as a CCD or a CMOS is used for the camera main body, it is possible that a two-dimensional read area which is structured by the respective pixels of the image pickup element can be varied in accordance with the output of the sensor, to thereby execute electronic image blur correction which corrects the image blur.

As described above, according to the above-mentioned respective embodiments, the image blur prevention function is executed in the case where both of the on/off changeover switches for the image blur prevention function at the camera main body side and the interchangeable lens side turn on, or in the case where any one of the on/off changeover switches for the image blur prevention function at the camera main body side and the interchangeable lens side turns on. Therefore, the operationality of the camera system can be improved.

What is claimed is:

1. A camera system with an image blur prevention function, comprising:
   an interchangeable lens;
   a camera main body to which the interchangeable lens is detachably attached;
   a first vibration detector disposed in the interchangeable lens;
   a first switch disposed in the interchangeable lens;
   a second vibration detector disposed in the camera main body;
   a second switch disposed in the camera main body;
   a third switch disposed in the camera main body and switched in conjunction with the operation of the release button; and
   a controller which can execute the image blur prevention function in a state where the third switch is on, and the first switch and the second switch are on.

* * * * *